United States Patent
Webb

[19]

[11] Patent Number: 6,112,451
[45] Date of Patent: Sep. 5, 2000

[54] STATEMENT REGARDING FEDERALLY SPONSORED RESEARCH OR DEVELOPMENT

[76] Inventor: Benjamin E. Webb, 365 Mountain Leader Trail, Tupelo, Miss. 38804

[21] Appl. No.: 09/348,546

[22] Filed: Jul. 7, 1999

[51] Int. Cl.[7] .......................... A01K 85/14; A01K 85/00
[52] U.S. Cl. ...................... 43/42.19; 43/42.49; 43/42.06
[58] Field of Search ................................ 43/42.19, 42.2, 43/42.21, 42.37, 42.49, 44.82, 43.16, 42.32, 42.34, 42.23, 42.11, 42.51, 42.06

[56]  References Cited

U.S. PATENT DOCUMENTS

| | | |
|---|---|---|
| 620,896 | 3/1899 | Edgar . |
| 913,440 | 2/1909 | Sutton . |
| 1,547,619 | 7/1925 | Shannon . |
| 2,235,600 | 3/1941 | Ammerman . |
| 2,281,809 | 5/1942 | Smith . |
| 2,583,942 | 1/1952 | Harvey . |
| 3,750,325 | 8/1973 | Feltman . |
| 4,637,158 | 1/1987 | Reid ....................................... 43/42.19 |
| 4,750,291 | 6/1988 | Chilton ................................... 43/44.82 |
| 5,138,789 | 8/1992 | Hood ....................................... 43/42.13 |
| 5,605,004 | 2/1997 | Boullt ..................................... 43/42.13 |
| 5,664,365 | 9/1997 | Walden .................................... 43/44.82 |
| 5,884,430 | 3/1999 | Livingston ............................. 43/44.82 |

Primary Examiner—Jack W. Lavinder

[57]  ABSTRACT

The invention, known as the "Ben Spin," is a novel design for a spinnerbait used in fishing. The new spinnerbait combines a visual and vibratory action that is attractive to many varieties of fresh and salt water fish. This invention provides dual line tie eyes, realistic baitfish fin features, dual barbed hooks with trailer hook mounts, snap back clips and arced blade modifications. The invention's unique features imitate a baitfish as it is pulled through the water. The flash of the novel blade's resulting air bubbles visually stimulates the attacking fish. The unique spinner blades produce an alluring and attractive sound to most predatory fish. Other fish attack the instant invention lure in response to perceived antagonistic vibration. The novel spinnerbait, known as a "Ben Spin," appeals to a fish's instincts and normal reactions to sight and sound stimuli and provides an increased advantage to the fisherman.

2 Claims, 1 Drawing Sheet

STATEMENT REGARDING FEDERALLY SPONSORED RESEARCH OR DEVELOPMENT

BACKGROUND OF THE INVENTION

The instant invention, known as the "Ben Spin," relates to an enhanced spinnerbait for fishing and provides for various improvements over all available spinnerbaits on the market today.

In the past, the need for artificial lures has produced a large variety of various types of fishing lures. Today, at any given time, you can walk into any store that sells fishing lures and find hundreds of different types of lures ranging in color, size, price and complexity.

Every possible color has been made available to purchase and can be used by any novice or experienced fisherman. Colors range anything from bubblegum pink to neon purple. Many fisherman are convinced of their own theories regarding the color of their bait.

Baitfish have also been available in many sizes. Many fisherman have tried varying the size of their bait in the hope of obtaining an advantage against their desired catch. Baits range in size from a thirty second of an ounce to six ounces. Again, every fisherman holds to his or her own time-tested theories.

Prices range depending on the brand of bait and type of bait being used but are usually incidental to the results a "special" lure might either promise or, in fact, produce. Fisherman will spend their last nickel to get their favorite lure. Although there are gimmicks on the fishing market today, there is some truth to some of their claims.

But the most important factor in fishing lures today is the complexity of the components and theories behind the use and subsequent success of any product. And that's what this invention provides for the average fisherman: a time tested review of known spinnerbaits with substantial improvements that provide the serious and casual fisherman alike with more fish!

The current invention addresses the on-going need for new and proven fishing lures. No spinnerbiat to date have provided dual line tie eyes, realistic baitfish fin features, dual barbed hooks with trailer hook mounts, snap back clips or blade modifications as the "Ben Spin" provides.

The inventor is aware of U.S. Pat. No. 5,605,004 which relates to fishing lures.

SUMMARY OF THE INVENTION

The instant invention speaks of an enhanced spinnerbait for fishing. The new and novel invention, referred to as a "Ben Spin," presents various enhancements over available spinnerbaits. The novel connection from the fishing line to the line tie eye provides a dual line tie connection point which enables the fisherman to have more than one choice of line placement. This newly designed dual line tie eye area allows the bait to be pulled in more than one angle in the water. The two arms of the spinnerbait, which extend from either side of the line tie eye contact area, can now be used in a variety of angles to best suit the fishing conditions. One arm connects to a snap back clip, a novelty not available on conventional spinnerbaits, which allows a quick and easy change of blade styles with a click of the clip. A clip arm and clip loop are provided for on one side of the invention to allow quick and easy connections. The other side of the invention contains a clip arm, clip loop, and a standard ball bearing swivel which allows free turning of the various parts. A plastic or rubber coated lifelike baitfish is provided and formed around one of the novel bait's arms. An attached or one-piece skirt arm extends from the lower section of the lifelike baitfish over one or more hooks which extend below the arm. To aid in the lifelike appearance, the baitfish includes protruding fin features at various positions around the edge of the fish.

Another novel aspect of the "Ben Spin" spinnerbait includes sections that extend from the spinner that are designed in a twisted arced shape that provide for an enhanced level of vibration to attract fish. In addition, each protruding section also includes one or more holes through which air bubbles will result when moved through the water. Similarly, one or more holes in one or more spinner blades will produce a different range of vibration.

An additional feature of the invention teaches a hook designed with extra barbs which will hold fish more securely. The extra barbs are positioned on opposite sides of the area forming the bent section of the hook. This additional feature of one or more dual-barbed hooks is especially novel to spinnerbaits as it has never been used on spinnerbaits. In addition, the curved under section of the one or more hooks contains a fixed holder mount to which a trailer hook can be attached.

BRIEF DESCRIPTION OF THE DRAWINGS

The features of the present invention which are believed to be novel are set forth by description within this application and may be best understood with reference to the accompanying drawings in which.

DETAILED DESCRIPTION OF THE INVENTION

Figure 1:
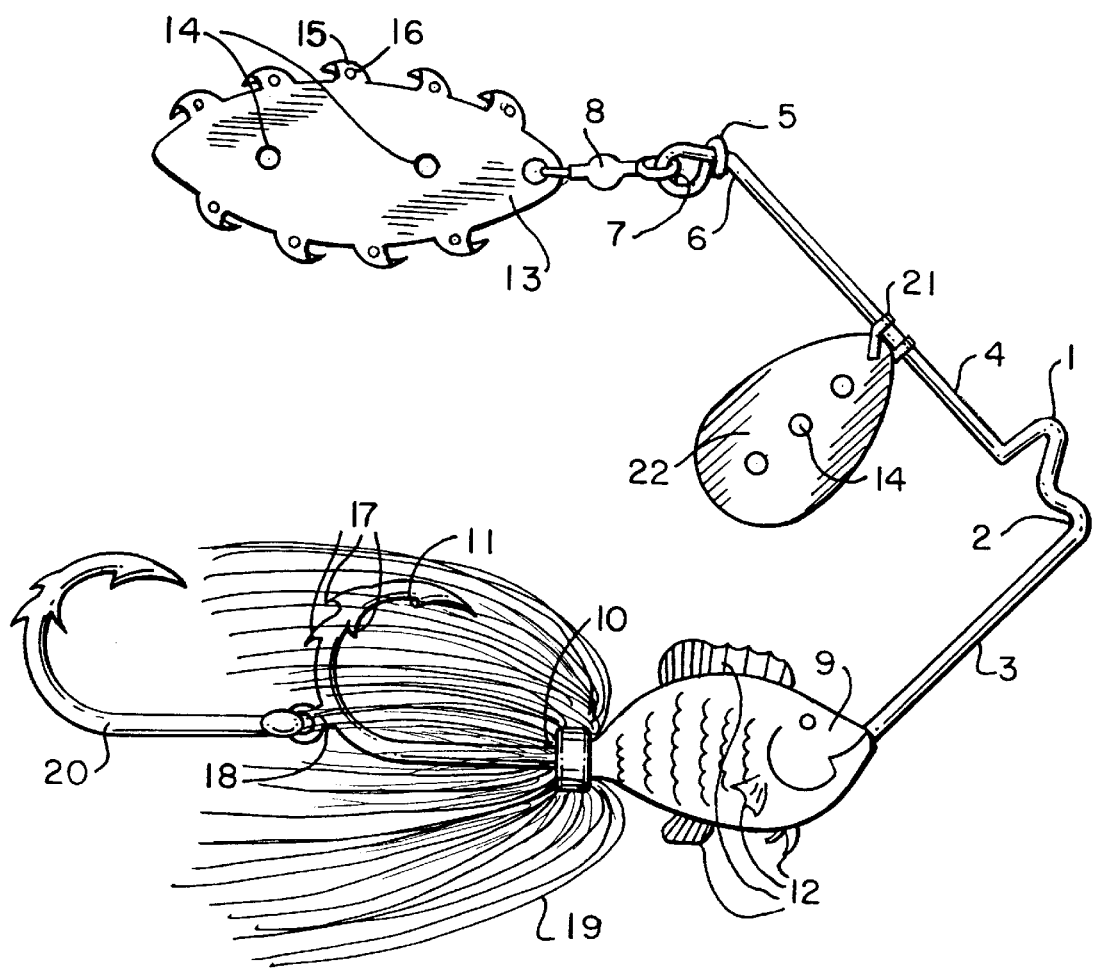
FIG. 1 is a side view illustrating the novel enhanced spinnerbait incorporating the present invention.

This invention relates to an enhanced spinnerbait for fishing. The new and novel invention presented in FIG. 1 attaches a fishing line to one of the line tie eyes 1 and 2. The dual line tie eye area provides the fisherman with a choice of line tie eye connection points. A first arm 3 and second arm 4 form the extended supports from the angled line tie eye 1 and 2. The second arm 4 extends to a snap back clip 5 which allows a quick and easy change of blade styles with a click of the clip. A clip arm 6 and clip loop 7 connect the snap back clip 5 to the second arm 4 on one side. The clip arm 6 and clip loop 7 form a connection on the other side to a standard ball bearing swivel 8 which allows free turning. A plastic or rubber coated lifelike baitfish 9, with a standard weighted head, is formed around the first arm 3 and leads to a skirt arm 10 and hook 11. The lifelike baitfish 9 consists of lifelike protruding fin features 12 at various positions consistent with real fish parts. A known willow leaf spinner blade 13 contains one or more holes 14 and is attached to a standard ball bearing swivel 8 and comprises a spinner 13 which comprises a plurality of twisted rotated arcs 15 that create vibration in which holes 16 create air bubbles to attract fish. The hook 11 is aligned with extra barbs 17 to more securely hold fish. A trailer hook holder mount 18 is attached to the underside of the curved section of the hook 11. A skirt 19 extends from the lower section of the lifelike baitfish 9 over the skirt arm 10, hook 11 and dual barbed trailer hook 20. A yoke 21 connects from the second arm 4 to a second spinner 22 which is aligned with a Colorado style blade which contains one or more holes 14.

I claim:

1. A fishing lure comprising a first arm connected at one end to a second arm and at the other end to a spinner blade, said second arm being connected to a fish hook at an end opposite the end connected to the first arm;

a line tie eye area formed at the connection between the first arm and the second arm; and, said spinner blade comprising a plurality of twisted arc shaped protrusions spaced along the circumference of the spinner blade wherein each protrusion comprises at least one hole extending therethrough;

whereby the lure is pulled through the water to cause the spinner blade to rotate while the water flows around and through the holes in the spinner blade in order to produce air bubbles which are attractive to fish.

2. A fishing lure comprising a first arm connected at one end to a second arm and at the other end to a spinner blade, said second arm being connected to a fish hook at an end opposite the end connected to the first arm, the connection between the spinner blade and the first arm is provided by a snap back clip; and, a line tie eye area formed at the connection between the first arm and the second arm, said line tie eye area comprises two adjacent line tie eyes for selectively attaching the fishing line to the fishing lure wherein each line tie eye is substantially u-shaped with a leg of the first unshaped line tie eye connected to a leg of the second u-shaped line tie eye.

| DTSV PTO TIMESHEET CODES |
|---|

The following provides the codes to be used on PTO DTSV timesheets. The paragraph letters refers to the capital letter printed on the attached time sheet.

A. This the Task Code, which is the second set of letters/numbers in the ACCOUNT code. This code reports the tech center in which you were working and which task you were performing. Across the top of the following table are listed the Tech Centers. Down the right column are listed the different task you can perform on this contract. Where a Tech Center column and a Task row intersect you will find the Task Code to enter on your timesheet.

| JOB | TECH CENTER CODE | 1600 A | 1700 B | 2700 C | 2800 D | 3600 E | 3700 F | Project Management 0 |
|---|---|---|---|---|---|---|---|---|
| Search Room Filing | 01 | A01 | B01 | C01 | D01 | E01 | F01 | |
| Mini Expansions | 02 | A02 | B02 | C02 | D02 | E02 | F02 | |
| Expansion Team | 03 | A03 | B03 | C03 | D03 | E03 | F03 | |
| File Inventory | 07 | A07 | B07 | C07 | D07 | E07 | F07 | |
| Tech Center Copying | 10 | A10 | B10 | C10 | D10 | E10 | F10 | |
| Walkup Copy Center | 11 | | | | | | F11 | |
| Central File Room | 12 | A12 | B12 | C12 | D12 | E12 | F12 | |
| File Retrieval | 13 | A13 | B13 | C13 | D13 | E13 | F13 | |
| DRAM | 15 | A15 | B15 | C15 | D15 | E15 | F15 | |
| Receptionist | 16 | | | | D16 | | | |
| Petitions | 17 | | | | D17 | | | |
| PCT Copy | 19 | | | | | | F19 | |
| PCT Copy Assembly | 20 | | | | | | F20 | |
| File Information Unit | 29 | | B29 | | | | | |
| Tech Center Supervisor | 32 | A32 | B32 | C32 | D32 | E32 | F32 | |
| Project Management | 32 | A32 | B32 | C32 | D32 | E32 | F32 | O32 |

B. The LABOR CODE determines the hourly rate of pay you will receive. The different codes are printed at the right bottom of the time sheet.
C. The PAY TYPE codes are printed at the bottom left of the time sheet. For most of your work you will enter "R".
D. Do not enter your Social Security Number until you sign the timesheet.

The date of the time sheet, your name and Tech Center will be pre-printed on your time sheet when you receive it.

\* \* \* \* \*

UNITED STATES PATENT AND TRADEMARK OFFICE
CERTIFICATE OF CORRECTION

PATENT NO.   : 6,112,451
DATED        : Sep. 5, 2000
INVENTOR(S)  : Benjamin E. Webb It is certified that error appears in the above-identified patent and that said Letters Patent is hereby corrected as shown below:

<u>Title page, Item [54] and Column 1, lines 1-3,</u>
Correct Title of Invention: ENHANCED SPINNERBAIT

<u>Columns 3-4,</u>
Delete: DTSV PTO TIMESHEET CODES (back page)

Signed and Sealed this

Sixth Day of August, 2002

*Attest:*

JAMES E. ROGAN
*Director of the United States Patent and Trademark Office*

*Attesting Officer*